Feb. 6, 1940. C. E. EMMER Re. 21,344

BINDING DEVICE

Original Filed Sept. 23, 1935

Witness:
Chas. R. Kourek.

Inventor,
CHARLES E. EMMER
By Maxwell F. Cargill Atty.

Reissued Feb. 6, 1940

Re. 21,344

UNITED STATES PATENT OFFICE 21,344

BINDING DEVICE

Charles E. Emmer, Chicago, Ill., assignor to Circla, Inc., Chicago, Ill., a corporation of Illinois Original No. 2,123,625, dated July 12, 1938, Serial No. 41,679, September 23, 1935. Application for reissue November 8, 1939, Serial No. 303,371

11 Claims. (Cl. 281—25)

This invention relates to binding devices.

One object of this invention is to provide a binder for perforated sheets, pamphlets or the like, which is formed of a single piece of suitable material, such as sheet metal, and which can be secured in binding relation with facility and economy by inter-engagement of integral portions of the device.

Another object of the invention is to provide a binding device preferably formed of a single piece of material, having a plurality of arms of ring form which are integral with a longitudinal strip to which the free ends of the arms are attached after the latter have been passed through perforations in the sheets, pamphlets or the like, to be bound.

A further object of the present invention is to provide a binding device comprising a backbone having a plurality of fingers extending therefrom and of generally ring shape wherein the backbone is disposed to lie in a non-radial plane of the circular cylinder defined by the fingers.

In the accompanying drawing illustrating exemplary embodiments of the invention, Figure 1 is a perspective view of one form of the improved binding device.

Figure 1:
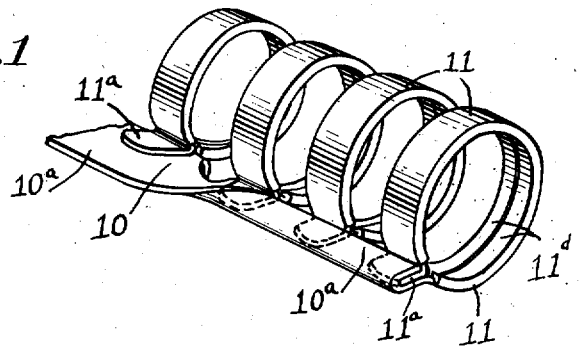
Figure 2:
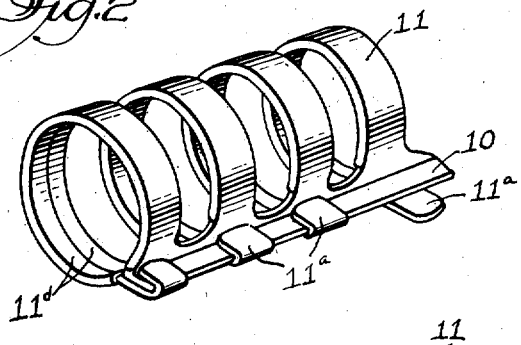
Figure 2 is a perspective view illustrating a different mode of securing the binding device in closed relation.
Figure 3:
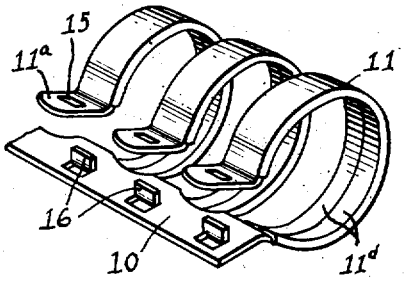
Figure 3 is a further modification of the invention.
Figure 4:
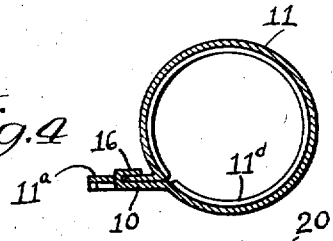
Figure 4 is a transverse sectional view of the structure of Figure 3 shown in closed position.
Figure 5:
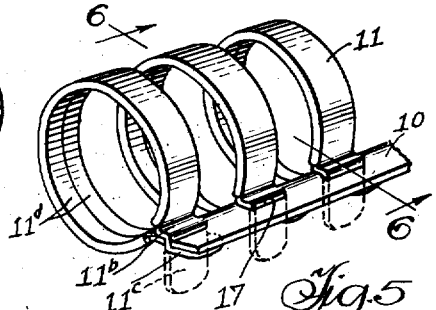
Figure 5 is a perspective view of an additional form of binder.
Figure 6:
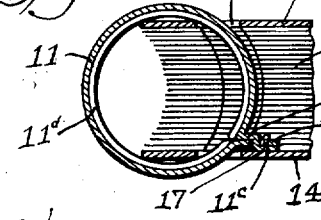
Figure 6 is a sectional view through a number of sheets bound by the device shown in Figure 5.

In Figures 1 to 6 inclusive the device comprises a longitudinal strip of backbone 10 from a lateral edge of which extend a plurality of parallel arms 11 which preferably are given the ring shape shown in Figure 3, prior to the insertion of the arms through perforations in the sheets or articles to be bound, such as perforations 12 in the sheets 13 and covers 14 illustrated in Figure 6.

The strips 10 and arms 11 may be formed of sheet metal, or a plastic such as celluloid or other suitable material. After the arms 11 have been passed through the perforations in the sheets to be bound, the ends 11*a*, which are directed outwardly of the circle defined by the arms, are pressed into contact with and secured to the strip 10 to form preferably a permanent binding for the sheets.

In Figure 1 the strip 10 is shown as being of a width greater than the length of the plane ends 11*a* of the arms. After insertion of the arms through the perforated sheets the plane ends 11*a* of the arms 11 are pressed into contact with the strip 10 and the outer margin 10*a* of the latter is then folded over the ends 11*a* to secure the arms in closed position.

In Figure 2 the corresponding parts are identified by the same reference characters employed in Figure 1, the major difference between the two forms residing in the fact that in the form shown in Figure 2 the plane ends 11*a* are of a length greater than the width of the strip 10 and the outer portions of the former are folded over the edge of the latter to hold the binder in closed position after the sheets to be bound have been assembled in the binder.

Any suitable tool or machine may be employed for bending the margin 10*a* of the strip over the ends 11*a* of the arms, as shown in Figure 1, or in folding the ends 11*a* of the strip 10 as shown in Figure 2.

In the form of the invention illustrated in Figure 3 the ends 11*a* of the arms 11 are provided with perforations 15 and the strip 10 has integral lugs 16 struck upwardly therefrom. The lugs are adapted to pass through the respective perforations 15 when the sheets to be bound have been assembled on the arms and the latter pressed into contact with the strip. The lugs 14 are then bent over into contact with the upper surface of the ends 11*a* to retain the latter in close contact with the strip 10 as illustrated in Figure 4.

In Figures 5 and 6 the strip 10 is provided with perforations of slots 17, and the ends of the arms have short, outwardly directed portions 11*b* which terminate in portions 11*c* which are disposed substantially at right angles to the portions 11*b* as shown in dotted lines in Figure 5. When the sheets have been assembled on the arms, the ends 11*c* are passed through the slots 17 and bent over into contact with the lower face of the strip 10 to retain the binder rings in closed position, as illustrated in full lines in Figure 5 and in Figure 6. The end portions 11*c* thus function as lugs, in much the same manner as the lugs 16 of the modification shown in Figures 3 and 4.

In all the forms of the invention above described the ends of the arms are held in close contact with the face of the strip and thus reduce the likelihood of the perforated edges of the bound sheets, when open, passing between the contacting surfaces of the arm ends and the strip and being torn when the sheets are turned to or from closed or book-like form illustrated in Figure 6.

Figure 7:
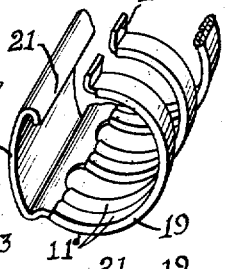
Figure 7 is a perspective view of a further modification.
Figure 8:
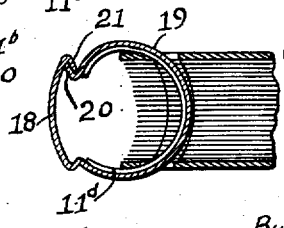
Figure 8 is a transverse section of sheets and covers bound by the device shown in Figure 7.

In Figures 7 and 8 the binder is also formed of a single piece of material which in this instance should be resilient, the binder comprising a strip 18 having arms 19 integral with one edge thereof. The arms terminate in hooks 20 adapted to engage the inwardly turned hook-edge 21 of the back 18 to retain the ring-like arms 19 in closed position after the perforated sheets or sheets and covers 22 and 23 have been assembled thereon as illustrated in Figure 8.

In this form of the invention the arms can be compressed into and released from engagement with the retaining edge 21. This type of binding device can thus be used for temporarily binding sheets or the like if desired. The strip 18 preferably is convex, as shown at its rear surface and provides space for affixing title, volume and library or other indicia, if desired.

In the forms of the invention above described, the strips 10 and the ends of the arms engaging the same are disposed preferably between one cover of the book and the bound sheets although these portions of the binding may be disposed in the middle of the book between the sheets or positioned at the rear edge of the bound sheets, if desired. However, a neater binding is provided and the covers can be opened back to back by disposing the strip and arm ends beneath one cover, and the assembly of the sheets upon the binder arms is also facilitated. For this reason the strips 10 and the engaging ends 11*a* of the arms 11 when in contact with a cover preferably lie in a plane parallel with the covers. The strip and interlocked ends of the arms therefore preferably lie in a non-radial plane of the circle or cylinder defined by the arms. Where the strip and arm ends are to lie midway of the bound sheets or are to extend rearwardly from the bound edges of the sheets they are disposed in a radial plane of the circle defined by the arms.

Figure 9:
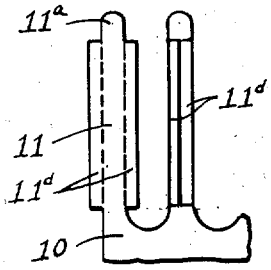
Figure 9 is a partial development of the binder.

The arms and strips of the above described devices can be formed of relatively thin material such as sheet metal. In order that the ring-shaped arms when formed of thin material shall be sufficiently rigid to retain their shape and that rough edges shall be avoided, it is preferred to form the arm blanks with side flanges 11*d* as illustrated in Figure 9. After the blank has been formed and prior to shaping the arms in curved or arcuate form, the flanges 11*d* are folded inwardly of the arms as shown at the right end of the figure to increase the rigidity or stiffness of the arm when the latter has been given the ring form. This double thickness of the metal thus increases the ability of the arms to retain their shape during use and provides smooth rounded edges at the sides of the arms which require no buffing to remove the burrs and sharp edge. The smooth rounded longitudinal edges of the arms are also more easily threaded through the perforations of the sheets in assembling the latter and facilitate turning the bound sheets during use.

The various forms of the invention illustrated in Figures 1 to 8 inclusive preferably will be provided with arms formed as above described. It will be noted that the flanges 11*d* terminate short of the free ends of the arms so as to avoid increasing the thickness of the material at the points where the arms are attached to the respective integral strips or back members.

While I have shown and described several means for attaching the ends of the arms to the strip which render the binding device economical and convenient both as to manufacture and use, I do not wish to be restricted specifically thereto except as so limited by the appended claims.

I claim as my invention:

1. A book of perforated sheets having a binding comprising a strip of sheet metal having arms extending from one longitudinal edge portion thereof and of ring-like form extending through the perforations of the sheets, one end of each arm being integral with said longitudinal edge and the other ends of the arms being directed outwardly from the respective ring-like portions and contacting a surface of said strip, said strip being of a width greater than the length of said outwardly directed ends and having the other longitudinal edge portion thereof folded over into close contact with said ends to secure the ends between said portions of the strip to retain the rings in fully closed relation.

2. A book of perforated sheets having a binding comprising a strip of sheet metal having arms extending from one longitudinal edge portion thereof and of ring-like form extending through the perforations of the sheets, one end of each arm being integral with said longitudinal edge and the other ends of the arms being directed outwardly from the respective ring-like portions and contacting a surface of said strip, said strip being of a width greater than the length of said outwardly directed ends and having the other longitudinal edge portion thereof folded over into close contact with said ends to secure the ends between said portions of the strip to retain the rings in fully closed relation with the ends of the curved portion of each arm in substantially abutting relation, each said arm having integral flanges on the longitudinal edges theroef folded over a face of the arm to stiffen the same and to provide smooth edges substantially coextensive with the curved portion of the arm.

3. A book of perforated sheets having a binding comprising a strip of sheet metal having arms extending from one longitudinal edge portion thereof and of loop-like form extending through the perforations of the sheets, one end of each arm being integral with said longitudinal edge and the other ends of the arms being directed outwardly from the respective loop-like portions and contacting a surface of said strip, said strip being of a width greater than the length of said outwardly directed ends and having the other longitudinal edge portion thereof folded over into close contact with said ends to secure the ends between said portions of the strip to retain the loops in fully closed relation.

4. A book of perforated sheets having a binding comprising a strip of sheet metal having arms extending from one longitudinal edge portion thereof and of loop-like form extending through the perforations of the sheets, one end of each arm being integral with said longitudinal edge and the other ends of the arms being directed outwardly from the respective loop-like portions and contacting a surface of said strip, said strip being of a width greater than the length of said outwardly directed ends and having the other longitudinal edge portion thereof folded over into close contact with said ends to secure the ends between said portions of the strip to retain the loops in fully closed relation with the ends of the curved portion of each arm in substantially abutting relation, each of said arms having integral flanges on the longitudinal edges thereof folded over a face of the arm to stiffen the same and to provide smooth edges substantially coextensive with the curved portion of the arm.

5. A book of perforated sheets having a binding comprising a backbone having a plurality of fingers extending therefrom, said fingers being generally ring-shaped and formed to extend through the perforations of said sheets, and said backbone being disposed to lie outside of any radial plane of said ring-shaped fingers.

6. A book of perforated sheets having a binding comprising a backbone having a plurality of fingers extending therefrom, said fingers being generally ring-shaped and formed to extend through the perforations of said sheets, and said backbone lying in a plane cutting eccentrically the rings defined by said fingers.

7. A book of perforated sheets having a binding comprising a backbone having a plurality of fingers extending therefrom, said fingers being generally ring-shaped and formed to extend through the perforations of said sheets, and said backbone being disposed at an oblique angle to the ring-shaped fingers at the junction of said fingers with said backbone.

8. A binding device comprising a thin flat longitudinally extending strip, a plurality of thin fingers integral with and projecting from one edge of said strip, each of said fingers being closed to form a ring lying in a plane perpendicular to said strip, said strip being disposed to lie in a plane cutting eccentrically across said rings, the angle between said strip and the ends of said fingers integral therewith being an acute angle.

9. A binding device comprising a thin flat longitudinally extending strip, a plurality of thin fingers integral with and projecting from one edge of said strip, each of said fingers being closed to form a ring lying in a plane perpendicular to said strip, said strip lying on the outside of said rings in a plane cutting eccentrically across said rings, the angle between said strip and the ends of said fingers integral therewith being an acute angle.

10. A binding device comprising a comb-shaped member having a backbone and a plurality of integral fingers extending therefrom, said fingers being shaped to provide a plurality of rings lying in parallel planes perpendicular to said backbone, said backbone lying in an oblique plane to the tangential plane of the rings at their junction line with said backbone.

11. A book of perforated sheets having a binding comprising a strip of sheet metal having arms extending from one longitudinal edge portion thereof and of ring-like form extending through the perforations of the sheets, one end of each arm being integral with said longitudinal edge and the other ends of the arms being directed outwardly from the respective ring-like portions and contacting a surface of said strip, said strip being of a width greater than the length of said outwardly directed ends and having the other longitudinal edge portion thereof folded over into close contact with said ends to secure the ends between said portions of the strip to retain the rings in fully closed relation, said strip being disposed at an oblique angle to the ringlike portions at the junction of the ring-like portions with said strip.

CHARLES E. EMMER.